UNITED STATES PATENT OFFICE.

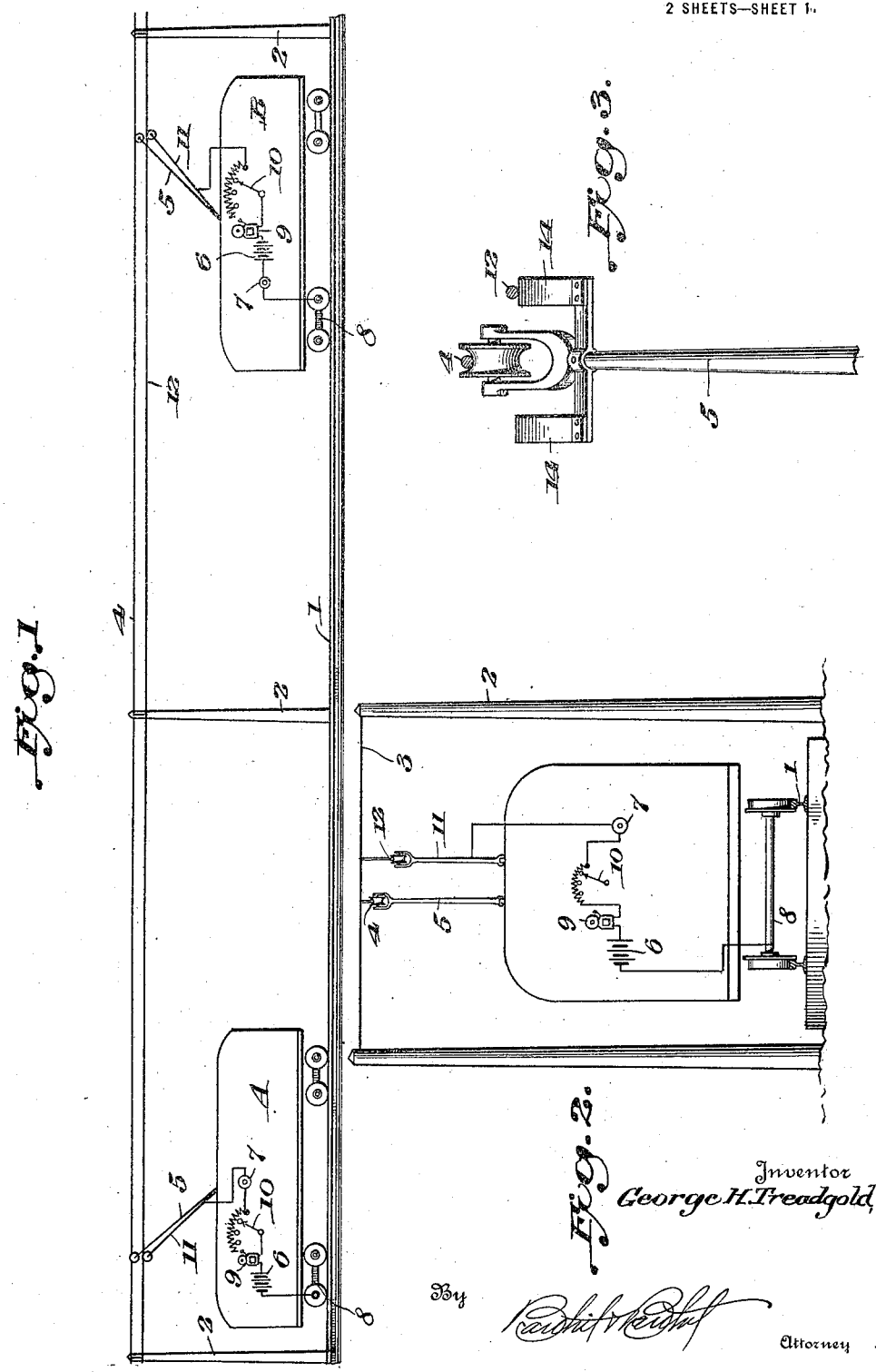

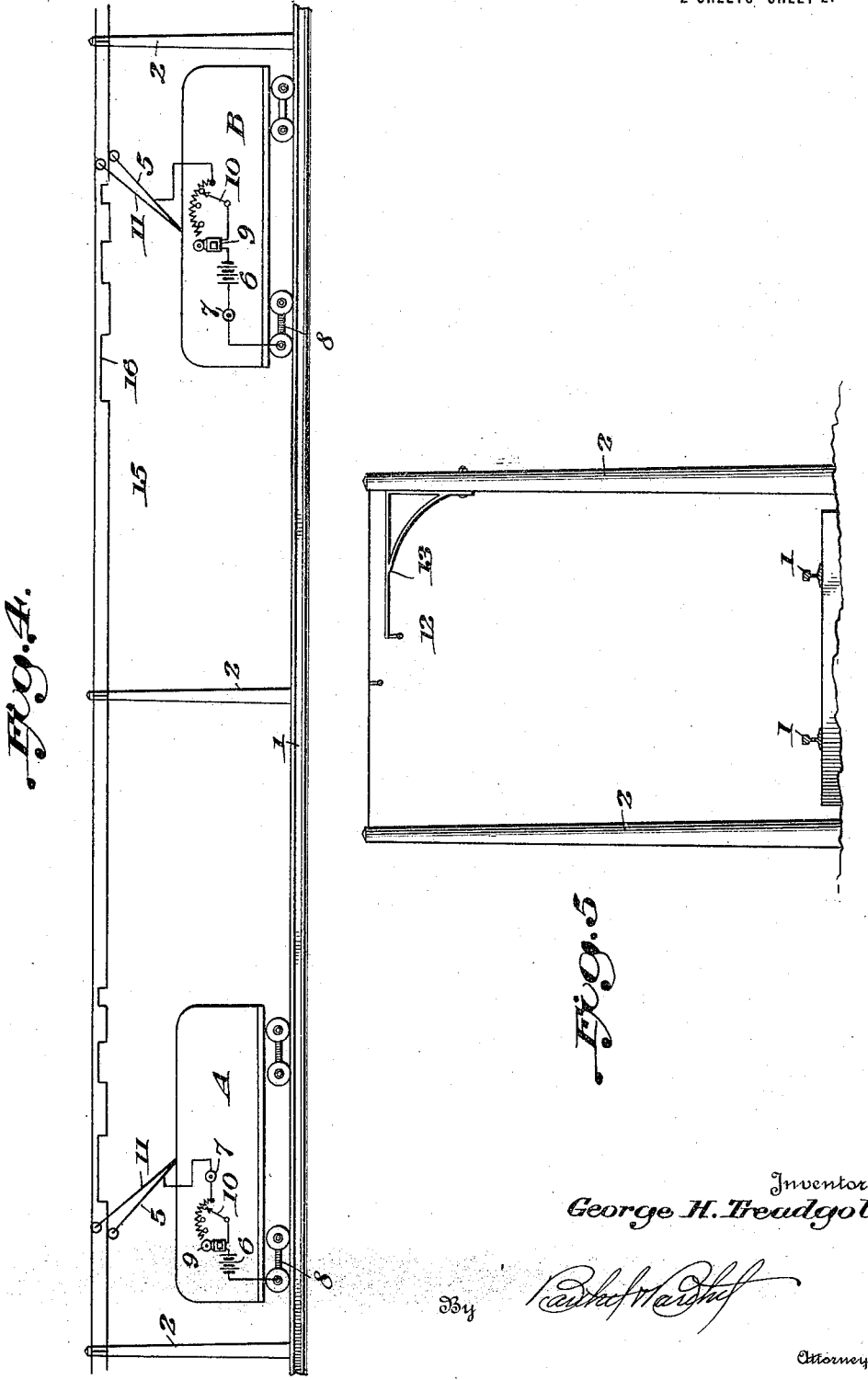

GEORGE H. TREADGOLD, OF PORT HURON, MICHIGAN, ASSIGNOR OF ONE-HALF TO WILLIAM B. ROBESON, OF PORT HURON, MICHIGAN.

SAFETY DEVICE FOR RAILWAYS.

1,298,833.  Specification of Letters Patent.  Patented Apr. 1, 1919.

Application filed January 28, 1918. Serial No. 214,226.

*To all whom it may concern:*

Be it known that I, GEORGE H. TREADGOLD, a citizen of the United States of America, residing at Port Huron, in the county of St. Clair and State of Michigan, have invented certain new and useful Improvements in Safety Devices for Railways, of which the following is a specification, reference being had therein to the accompanying drawings.

This invention relates to a safety device for railways and has special reference to an electrical safety or signaling device that may be used in connection with various electrically operated railways to avoid head and rear on collisions, and permit of the operation of cars on dangerous sections of a road and under all climatic conditions.

My invention aims to provide electrical car equipments that may be utilized as safety signals or alarms for signaling from one car to another, and this is accomplished without the use of a third rail, signal towers and stations, or any ground equipment that may be rendered useless by short circuiting, derailments or from other causes.

My invention further aims to provide a simple and durable safety device that may be easily and quickly installed without immaterial changes or alterations in the present operating system of electrical railways, and the invention will be hereinafter specifically described and then claimed.

Reference will now be had to the drawings, wherein—

Figure 1 is a diagrammatic elevation of a section of railway in accordance with my invention;

Fig. 2 is an enlarged diagrammatic cross-sectional view of the same;

Fig. 3 is a front elevation of a portion of a trolley pole provided with brushes;

Fig. 4 is a diagrammatic elevation of a section of railway, showing a modification of my invention; and Fig. 5 is a front elevation of a trolley wire bracket.

In the drawings, the reference numeral 1 denotes rails of a track and these rails serve as electrical conductors.

At the sides of the track are trolley poles 2 provided with cross wires or hangers 3 for a main trolley wire 4.

On the track and adapted to travel thereon are electrically operated cars, which have been generally designated A and B and each car has a trolley pole and wheel 5 adapted to engage the main trolley wire 4 and establish an operative electric circuit for each car. These cars may be of the large type used on interurban railways or of the small type used on industrial railways, and in either instance each car has the necessary electrical equipment for traveling purposes.

My invention resides in providing each car with an independent source of electrical energy, as batteries 6 and the battery is connected to a normally closed push button or switch 7, which in turn is connected to a track 8 of the car. The car is also equipped with an electrical bell or audible alarm 9 and a conventional form of rheostat 10, these elements being in circuit with the battery 6 and with an auxiliary trolley pole and wheel 11 carried by the top of the car. The auxiliary trolley wheel is adapted to engage and ride on an auxiliary trolley wire 12, which as shown in Figs. 1 and 2, may be suspended from the cross wires or hangers 3 parallel with the main trolley wire 4, but in a plane below the same. In some instances, the auxiliary trolley wire 12 may be supported by a bracket 13, from each trolley pole 2, and the auxiliary trolley pole 11 may be dispensed with by providing the main trolley pole 5 with brushes 14 adapted to engage and wipe the auxiliary trolley wire, either of an eastbound or westbound track.

The auxiliary trolley wire 12 may extend throughout the entire length of a railway or a desired length of the same may be placed at switches, side tracks, sharp curves, danger or safety zones, and especially on sharp curves or in hilly country, where it is impossible for the operators of cars to observe the approach of each other.

Assuming that the cars A and B are approaching each other on the same track and that the car A enters a danger zone prior to the car B, there will be no complete signal circuit until the car B enters the same zone as the car A; then a signal circuit will be completed and the bells or audible signals 9 will be operated. These signals will indicate to the operator of each car that there is danger ahead, and should the car A have the right of way, the operator of said car immediately actuates the push button 7 a number of times, according to a prearranged signal. The breaking of the circuit a predetermined number of times will indicate to the operator of car B that car A has the right of way, and the operator of car B may send back an answering signal by actuating the push button in his car. Both cars may cease to travel and thus avoid collision. Now, the same thing applies when one car is following another and both cars happen to be in the same zone. When such occurs the operators of the cars will signal to each other by a prearranged code, so that one car may follow very close on the other. This may be made automatic to a certain degree through the medium of the rheostat 10, which may be set so that one car may approach the other a predetermined safety distance, before the bells or audible signals will be sounded. The rheostats which are of a conventional form, may be employed for cutting in and out desired degrees of resistance, so that the bells or audible signals will be operted when the cars are in proximity to each other.

To provide for automatic signaling, according to a predetermined code, an auxiliary trolley wire 15 may have gaps or insulated portions 16, as shown in Fig. 4, whereby the circuit will be successively broken for various periods of time thus indicating to the operator of each car a predetermined signal.

The push buttons may be dispensed with when the rheostats may be used similar to switches for breaking and making circuits.

What I claim is:—

In a signal for electrically operated railways, the combination with a track having danger zones, a main trolley wire and cars adapted to receive power from said main trolley wire and enter said zones, of an independent source of electrical energy on each car adapted for signal circuits including said track, audible signals and normally closed switches adapted to be in said circuits, an auxiliary trolley wire having gaps, an auxiliary trolley pole and wheel for each car adapted to complete signal circuits when two cars enter a single zone, said auxiliary trolley wheel being adapted to travel on said auxiliary trolley wire and through the medium of the gaps in said wire causing a circuit to be successively broken for various periods of time to indicate to the operators of said cars a predetermined signal, and a rheostat on each car adapted to control the operation of said audible signal.

In testimony whereof I affix my signature in the presence of two witnesses.

GEORGE H. TREADGOLD.

Witnesses:
KARL H. BUTLER,
ANNA M. DORR.

Copies of this patent may be obtained for five cents each, by addressing the "Commissioner of Patents, Washington, D. C."